(12) United States Patent
Yoshimura et al.

(10) Patent No.: US 12,294,324 B2
(45) Date of Patent: May 6, 2025

(54) MOTOR DRIVE UNIT AND REFRIGERATION CYCLE APPARATUS

(71) Applicant: Carrier Japan Corporation, Tokyo (JP)

(72) Inventors: Masayuki Yoshimura, Fuji (JP); Masaya Nogi, Fuji (JP); Nariya Komazaki, Fuji (JP); Ken Miura, Fuji (JP)

(73) Assignee: Carrier Japan Corporation, Tokyo (JP)

( * ) Notice: Subject to any disclaimer, the term of this patent is extended or adjusted under 35 U.S.C. 154(b) by 136 days.

(21) Appl. No.: 17/942,037

(22) Filed: Sep. 9, 2022

(65) Prior Publication Data
US 2023/0020906 A1 Jan. 19, 2023

Related U.S. Application Data

(63) Continuation of application No. PCT/JP2020/010958, filed on Mar. 12, 2020.

(51) Int. Cl.
*H02P 25/18* (2006.01)
*F25D 21/00* (2006.01)
*H02P 27/06* (2006.01)

(52) U.S. Cl.
CPC ............ *H02P 25/18* (2013.01); *F25D 21/002* (2013.01); *H02P 27/06* (2013.01)

(58) Field of Classification Search
CPC ........ H02P 25/18; H02P 27/06; F25D 21/002; F25B 2313/0233; F25B 2700/151; F25B 2700/171; F25B 13/00; F25B 49/025
See application file for complete search history.

(56) References Cited

FOREIGN PATENT DOCUMENTS

| CN | 203857577 U | 10/2014 |
| JP | 4906836 B | 3/2012 |
| JP | 2019062726 A | 4/2019 |
| JP | 2019176554 A | 10/2019 |
| JP | 2019198152 A * | 11/2019 |

OTHER PUBLICATIONS

PCT Search Report and Written Opinion mailed on Jun. 2, 2020 for PCT Application No. PCT/JP2020/010958, 7 pages.
Philippines Office Action mailed on May 27, 2024, for Philippines Application No. 1-2022-552398 a foreign counterpart of U.S. Appl. No. 17/942,037, 5 pages.

* cited by examiner

*Primary Examiner* — Kun Kai Ma
(74) *Attorney, Agent, or Firm* — Lee & Hayes, P.C.

(57) ABSTRACT

According to one embodiment, a motor drive unit includes a motor including a plurality of phase windings in a mutually unconnected state, a first inverter which controls application of electric power to one ends of the phase windings, a second inverter which controls application of electric power to the other ends of the phase windings, relays each of which includes a make break contact connected between the other ends of the phase windings, and a controller which switches, according to a value of a current flowing through the motor, between an open-windings mode and a star-connection mode.

6 Claims, 5 Drawing Sheets

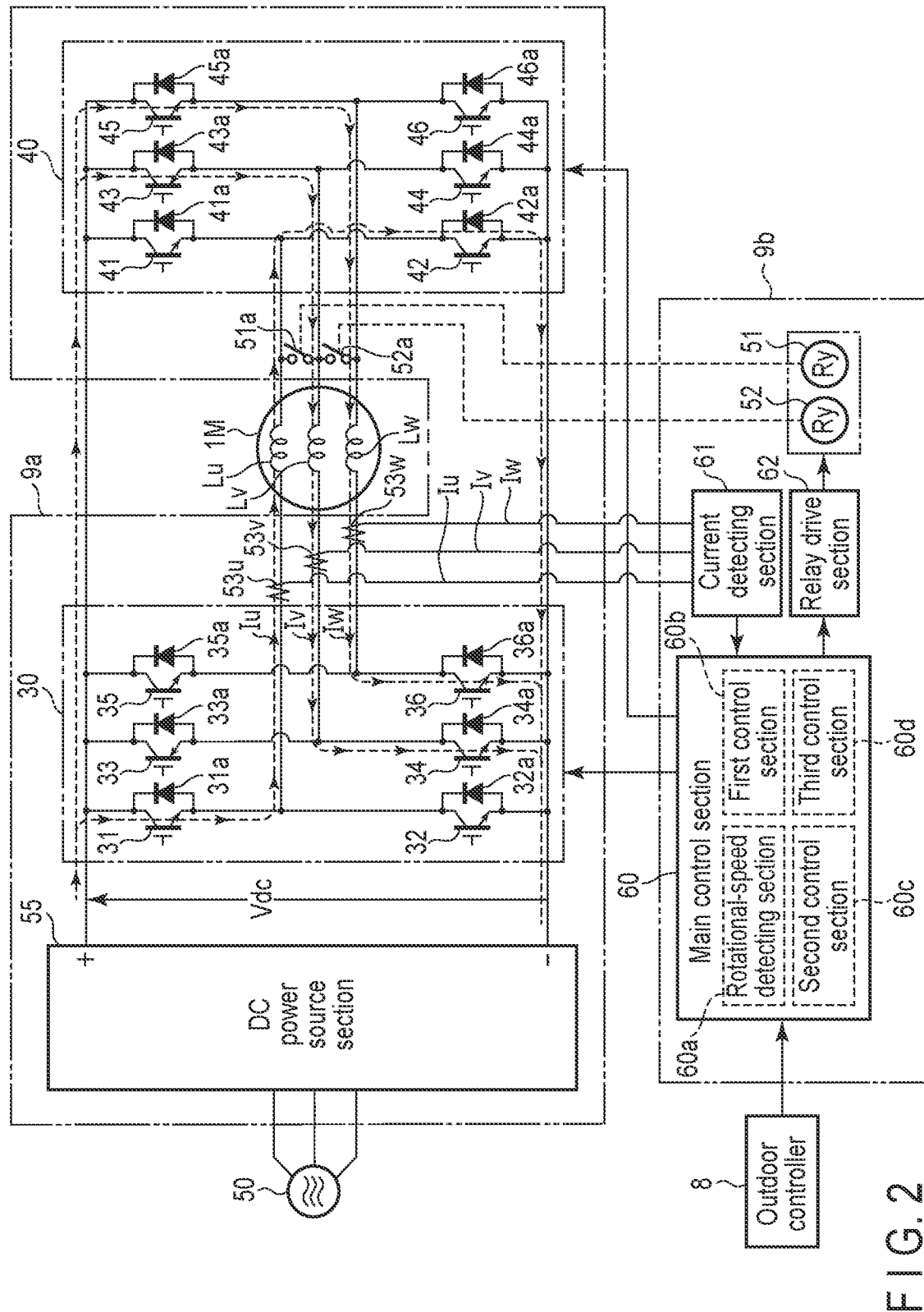
F I G. 2

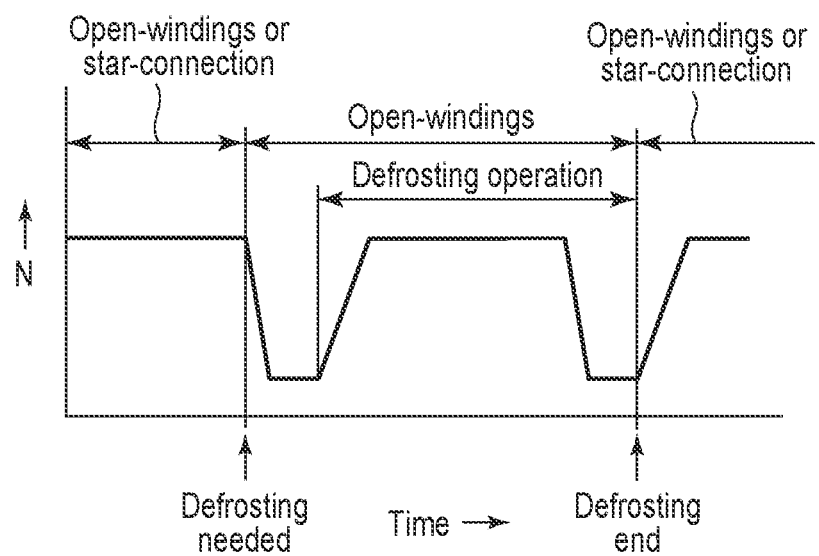
F I G. 7

MOTOR DRIVE UNIT AND REFRIGERATION CYCLE APPARATUS

CROSS-REFERENCE TO RELATED APPLICATIONS

This application is a Continuation Application of PCT Application No. PCT/JP2020/010958, filed Mar. 12, 2020, the entire contents of which are incorporated herein by reference.

FIELD

Embodiments described herein relate generally to a motor drive unit configured to drive a motor including a plurality of phase windings in a mutually unconnected state and refrigeration cycle apparatus including the motor drive unit.

BACKGROUND

As a drive motor of a compressor to be mounted on a refrigeration cycle apparatus such as an air conditioner or the like, a permanent magnet synchronous motor including a plurality of phase windings is used. Further, as an example of the permanent magnet synchronous motor (referred to also as a DC brushless motor), an open-windings motor configured in such a manner that a plurality of phase windings are placed in a mutually unconnected state is known.

A motor drive unit configured to drive the open-windings motor (abbreviated as a motor) includes a first inverter configured to control application of electric power to one end of each phase winding of the motor, second inverter configured to control application of electric power to the other end of each phase winding of the motor, and switches connected between the other ends of the phase windings, and selectively sets one of a star-connection mode in which the phase windings are connected to each other to form a star connection (referred to also as an star-shaped connection) by closing of the switches, whereby switching of the first inverter is separately carried out, and open-windings mode in which the phase windings are brought into an unconnected state by opening of the switches, whereby switching operations of the first and second inverters are carried out in coordination with each other. By setting of the open-windings mode, it is possible to drive the motor at a high rotational speed, further, by setting of the star-connection mode in the low-rotational-speed range, it is possible to drive the motor with high efficiency, and hence it becomes possible to drive the motor as efficiently as possible over a wide operation range from the high rotational speed to the low rotational speed. Expansion in the operation range of the motor and improvement in the efficiency of the motor drive unit are made compatible with each other.

As a switch used to switch between the star-connection mode and open-windings mode, for example, a mechanical relay having a mechanical make/break contact is used. In order to guarantee the adequate operation, there is an upper limit for a current flowing through the make/break contact. This upper limit is generally called a rated energizing current or rated contact current (hereinafter referred to as the rated energizing current). When an overcurrent exceeding the rated energizing current continues to flow through the make/break contact, there is a possibility of the relay breaking down. Further, the mechanical relay has a lifetime corresponding to the number of times of operations. The more the number of times of switching between the star-connection mode and open-windings mode, the shorter the lifetime becomes.

An embodiment described herein aims to provide a refrigeration cycle apparatus capable of preventing an overcurrent from flowing through a make/break contact of a relay, further capable of making the number of times of operations of the relay as small as possible, and thereby capable of realizing an improvement in the lifetime of the relay.

BRIEF DESCRIPTION OF THE DRAWINGS

FIG. 2 is a block diagram showing the configuration of the motor drive unit of the embodiment.

FIG. 7 is a view showing an example of changes in the motor rotational speed from a defrosting preparation to defrosting start and defrosting end of the refrigeration cycle apparatus according to the embodiment.

DETAILED DESCRIPTION

Figure 1:
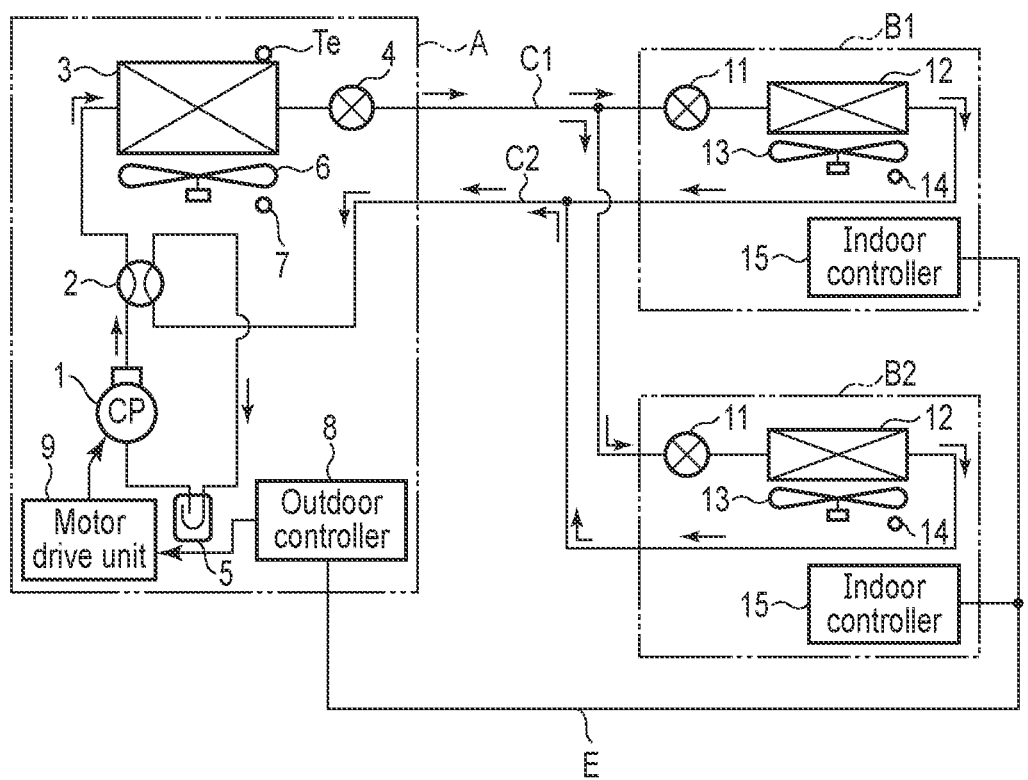
FIG. 1 is a block diagram showing the configuration of a refrigeration cycle apparatus including a motor drive unit of an embodiment.

In general, according to one embodiment, a motor drive unit of claim 1 comprising: a motor including a plurality of phase windings in a mutually unconnected state; a first inverter which controls application of electric power to one ends of the phase windings; a second inverter which controls application of electric power to the other ends of the phase windings; relays each of which includes a make/break contact connected between the other ends of the phase windings; and a controller which switches, according to a value of a current flowing through the motor, between an open-windings mode in which the other ends of the phase windings are placed in the unconnected state by opening of the relays, and switching operations of the first and the second inverters are carried out in coordination with each other, and a star-connection mode in which the other ends of the phase windings are connected to each other by closing of the relays, and switching of the first inverter is thereby carried out.

Hereinafter a refrigeration cycle apparatus of an embodiment will be described below with reference to the accompanying drawings. As an example of the refrigeration cycle apparatus, a so-called multi-type air conditioner in which a plurality of outdoor units and a plurality of indoor units are connected in parallel with each other will be described. The refrigeration cycle apparatus is not limited to the air conditioner, and the description of the embodiment can also be applied to other refrigeration cycle apparatus such as a heat pump type chiller unit, refrigerator, and the like.

As shown 1, for example, two indoor units B1 and B2 are connected to an outdoor unit A through a liquid-side pipe C1 and gas-side pipe C2 in a state where the units B1 and B2 are in parallel with each other. Further, between each of the outdoor unit A and indoor units B1 and B2, signal lines E for data transmission and control are connected. By the connections between the outdoor unit A and indoor units B1 and B2, a multi-type air conditioner configured to carry out cooling and heating is constituted. In the refrigeration cycle apparatus, the outdoor unit A functions as a parent unit for overall control, and indoor units B1 and B2 function as child units operating according to instructions from the parent unit.

The outdoor unit A includes a compressor 1, four-way valve 2, outdoor heat exchanger 3, expansion valve (pressure reducer) 4, accumulator 5, outdoor fan 6, outdoor temperature sensor 7, heat exchanger temperature sensor Te, outdoor controller 8, and motor drive unit 9 of this embodiment. At the time of a cooling operation, as indicated by solid arrows, the gaseous refrigerant flowing from the indoor units B1 and E2 into the gas-side pipe C2 is sucked into the compressor 1 through the four-way valve 2 and accumulator 5, gaseous refrigerant compressed by the compressor 1 and discharged therefrom flows into the heat exchanger 3 (condenser) through the four-way valve 2, and refrigerant condensed in the outdoor heat exchanger 3 by heat exchange with the outdoor air flows into the indoor units B1 and B2 through the expansion valve 4 and liquid-side pipe C1. At the time of a heating operation, the flow paths of the four-way valve 2 are switched, and thus, the liquid refrigerant flowing from the indoor units B1 and B2 into the liquid-side pipe C1 flows into the outdoor heat exchanger 3 (evaporator) through the expansion valve 4, refrigerant evaporated in the outdoor heat exchanger 3 by heat exchange with the outdoor air is sucked into the compressor 1 through the four-way valve 2 and accumulator. 5, and gaseous refrigerant compressed in the compressor 1 and discharged therefrom flows into the indoor units B1 and B2 through the four-way valve 2 and gas-side pipe C2.

It should be noted that at the time of a heating operation, on the surface of the outdoor heat exchanger 3 functioning as an evaporator, frost gradually grows and, when the frost is left as it is, the heat exchange amount of the outdoor heat exchanger 3 is reduced. As a countermeasure against the problem, the outdoor controller 8 senses the temperature of the outdoor heat exchanger 3 by the heat exchanger temperature sensor Te, monitors the frost formation amount of the outdoor heat exchanger 3 from the sensed temperature thereof, when the frost formation amount increases to a considerable amount, begins defrosting preparation for reducing the motor rotational speed N on the basis of the determination that defrosting of the outdoor heat exchanger 3 is needed and, when the motor rotational speed N is reduced to a predetermined value, begins a defrosting operation of raising the motor rotational speed N to the high-rotational-speed range while switching the flow path of the four-way valve 2 to the defrosting flow path to thereby remove the frost adhering to the outdoor heat exchanger 3 by the heat of the refrigerant. Then, the outdoor controller 8 monitors the frost formation state of the outdoor heat exchanger 3 on the basis of the sensed temperature of the heat exchanger temperature sensor Te, reduces the motor rotational speed N at the point in time when the frost formation is eliminated and, when the motor rotational speed N is lowered to a predetermined value, restores the flow path of the four-way valve 2 to the original heating flow path to thereby terminate the defrosting operation. Further, at the point in time of the determination that defrosting is needed, the outdoor controller 8 notifies the motor drive unit 9 of the need for defrosting, begins defrosting preparation concomitantly with the issuance of the notification and, at the point in time when the defrosting operation is completed, notifies the motor drive unit 9 of the fact of the defrosting completion.

Each of the indoor units B1 and 62 includes a flow regulating valve 11, indoor heat exchanger 12, indoor fan 13, indoor temperature sensor 14, and indoor controller 15. At the time of a cooling operation, as indicated by the solid arrows, the liquid refrigerant flowing from the outdoor unit A into the liquid-side pipe C1 flows into each indoor heat exchanger (evaporator) 12 through each flow regulating valve 11, and refrigerant evaporated in each indoor heat exchanger 12 by heat exchange with the indoor air returns to the outdoor unit A through the gas-side pipe C2. At the time of a heating operation, the gaseous refrigerant flowing from the outdoor unit A into the gas-side pipe C2 flows into each indoor heat exchanger (condenser) 12, and refrigerant condensed in each indoor heat exchanger 12 by heat exchange with the indoor air returns to the outdoor unit A through the liquid-side pipe C1. The flow regulating valve 11 is a pulse-motor valve (PMV) in which the degree of opening (aperture) is continuously changed from the fully closed position to the fully opened position according to the number of drive voltage pulses to be supplied thereto. The indoor fan 13 sucks the indoor air therein and sends the air to the indoor heat exchanger 12. The indoor temperature sensor. 14 is arranged in the flow path of the indoor air sucked by the indoor fan 13 and senses the temperature Ta of the indoor air. The indoor controller. 15 detects a difference $\Delta Ta$ between the sensed temperature Ta of the indoor temperature sensor 14 and preset indoor temperature Ts as the air-conditioning load, controls the degree of opening (aperture) of the flow regulating valve 11 according to the air-conditioning load $\Delta Ta$, and notifies the outdoor controller 8 of the air-conditioning load $\Delta Ta$ by the signal line E.

The outdoor controller 8 controls the compressor 1, rotational speed of the outdoor fan 6, and the like in order that the outdoor unit A can exert the capability corresponding to the total load of the air-conditioning loads $\Delta Ta$ notified from the indoor units B1 and B2.

The compressor 1 is an encapsulated type compressor in which the motor 1M shown in FIG. 2 is accommodated in a hermetically sealed case as the drive motor together with a compressing portion. The motor 1M is a three-phase permanent magnet synchronous motor and is a so-called open-windings motor having a plurality of phase windings Lu, Lv, and Lw in a mutually unconnected state. Each of the phase windings Lu, Lv, and Lw is configured by winding a thin copper wire in a large number of turns at a high density in order that the efficiency can be improved in the low-rotational-speed range (referred to also as the low-and-medium rotational speed range).

The motor drive unit 9 of the outdoor unit A1 to A3 includes a drive circuit 9a and controller. 9b shown in FIG. 2. The drive circuit 9a includes a CC power source section 55 configured to subject AC voltages of a three-phase AC power source 50 to full-wave rectification, smooth the rectified voltage, and output the smoothed voltage, inverter. (referred to also as a first inverter or master inverter) 30 configured to control energization between the output ends of the DC power source section 55 and one ends of the phase windings Lu, Lv, and Lw of the open-windings motor 1M, and inverter (referred to also as second inverter or slave inverter) 40 configured to control energization between the output ends of the DC power source section 55 and the other ends of the phase windings Lu, Lv, and Lw of the open-windings motor 1M. The power-communalized system in which the DC power source 55 is made the DC power source common to the inverters 30 and 40 is employed.

The inverter 30 includes a U-phase series circuit in which switching elements, e.g., IGBTs 31 and 32 are connected in series, and interconnection point of the IGBTs 31 and 32 is connected to one end of the phase winding Lu of the open-windings motor 1M, V-phase series circuit in which switching elements IGBTs 33 and 34 are connected in series, and interconnection point of the IGBTs 33 and 34 is connected to one end of the phase winding Lv of the open-windings motor 1M, and W-phase series circuit in which switching elements IGBTs 35 and 36 are connected in series, and interconnection point of the IGBTs 35 and 36 is connected to one end of the phase winding Lw of the open-windings motor 1M, and controls application of power from the positive-side output end of the DC power source 55 to one ends of the phase windings Lu, Lv, and Lw and application of power from one ends of the phase windings Lu, Lv, and Lw to the negative side output end of the DC power source 55 by switching of the IGBTs 31 to 36. Each of diodes for regeneration (referred to also as freewheel diodes) 31a to 36a is connected in inverse parallel with each of the IGE s 31 to 36.

In the inverter 40, a U-phase series circuit in which switching elements IGBTs 41 and 42 are connected in series, and interconnection point of the IGBTs 41 and 42 is connected to the other end of the phase winding Lu of the open-windings motor 1M, V-phase series circuit in which switching elements IGBTs 43 and 44 are connected in series, and interconnection point of the IGBTs 43 and 44 is connected to the other end of the phase winding Lv of the open-windings motor 1M, and W-phase series circuit in which switching elements IGBTs 45 and 46 are connected in series, and interconnection point of the IGBTs 45 and 46 is connected to the other end of the phase winding Lw of the open-windings motor 1M are connected in parallel with each other, and application of power from the positive-side output end of the DC power source 55 to the other ends of the phase windings Lu, Lv, and Lw and application of power from the other ends of the phase windings Lu, Lv, and Lw to the negative side output end of the DC power source 55 are controlled by switching of the IGBTs 41 to 46. Each of diodes for regeneration (referred to also as freewheel diodes) 41a to 46a is connected in inverse parallel with each of the IGBTs 41 to 46.

It should be noted that the inverter 30 is actually a module, i.e., a so-called intelligent power module (IPM) in which a main circuit formed by connecting the aforementioned three series circuits of the U phase, V phase, and W phase in parallel with each other, and peripheral circuits such as a drive circuit and the like configured to drive the IGBTs 31 to 36 of the main circuit are accommodated in a single package. In the inverter. 40 too, an IPM of the same configuration is used.

Between the other end of the phase winding Lu of the motor 1M and the other end of the phase winding Lv, a normally open make/break contact (referred to as a relay contact) 51a of a mechanical relay 51 is connected. Between the other end of the phase winding Lv of the motor. 1M and the other end of the phase winding Lw, a normally open make/break contact (referred to as a relay contact) 52a of a mechanical relay 52 is connected. Energization-on and energization-off of the relays 51 and 52 are controlled by the controller 9b in synchronization with each other. When the relays 51 and 52 are energized, the relay contacts 51a and 52a are closed, and the other ends of the phase windings Lu, Lv, and Lw are connected to each other, whereby the phase windings Lu, Lv, and Lw enter the star-connection state. When the relays 51 and 52 are de-energized, the relay contacts 51a and 52a are opened, and phase windings Lu, Lv, and Lw enter an unconnected state, i.e., the open-windings state where the phase windings Lu, Lv, and Lw are electrically separate from each other.

In order to maintain an adequate operation of the relays 51 and 52, there is an upper limit for a current flowing through each of the relay contacts 51a and 52a, i.e., a so-called rated energizing current. If an overcurrent exceeding the rated energizing current flows through each of the relay contacts 51a and 52a, the possibility of the relays being broken becomes stronger. When relays 51 and 52 having a larger rated energizing current are used, the size of each of the relays 51 and 52 also becomes larger and the cost becomes higher, and hence it is hopefully desirable that relays each having a smaller rated energizing current be used. Further, the number of times of opening closing of each of the relay contacts 51a and 52a largely affects the lifetime of each of the relays 51 and 52. That is, when the number of times of opening/closing of each of the relay contacts 51a and 52a becomes larger, the lifetime of each of the relays expires to lead to a failure.

Current sensors 53u, 53v, and 53w are arranged on the three energizing lines between the inverter 30 and one ends of the phase windings Lu, Lv, and Lw, and output signals of these current sensors 53u, 53v, and 53w are sent to the controller 9b. The current sensors 53u, 53v, and 53w sense currents (referred to as motor currents) Iu, Iv, and Iw flowing through the phase windings Lu, Lv, and Lw.

The controller 9b is a controller configured to execute, at the time of the star-connection mode to be described later, sensorless vector control of estimating the rotational speed of the motor 1M from the motor current I and controlling separate switching of the inverter 30 in such a manner that the estimated rotational speed becomes a target rotational speed corresponding to an instruction from the outdoor controller 8 and execute, at the time of the open-windings mode to be described later, sensorless vector control of the open-windings mode of controlling switching of the inverters 30 and 40 in such a manner that the estimated rotational speed becomes the target rotational speed, and includes a main control section 60 serving as the center of control, current detecting section 61, relay drive section 62, display section 63, relays 51 and 52, and the like. The current detecting section 61 detects an instantaneous value of each of the motor currents Iu, Iv, and Iw sensed by the current sensors 53u, 53v, and 53w. The instantaneous value of each of the motor currents Iu, Iv, and Iw is referred to as the motor current I. The relay drive section 62 energizes or de-energizes the relays 51 and 52 according to an instruction from the main control section 60. The main control section 60 is constituted of a microcomputer and peripheral circuits thereof, and controls make/break of the relay contacts 51a and 52a and switching of the inverters 30 and 43 according an instruction from the outdoor controller 8, detection result of the current detecting section 61, and the like.

The main control section 60, in particular, is a section configured to carry out switching between the open-windings mode in which the other ends of the phase windings Lu, Lv, and Lw are brought into an unconnected state by opening of the relay contacts 51a and 52a, and switching operations of the inverters 30 and 40 are carried out in coordination with each other, and star-connection mode in which the other ends of the phase windings Lu, Lv, and Lw are connected to each other by closing of the relay contacts 51a and 52a, and switching of only the inverter 30 is separately carried out according to at least the value of the motor current I, and includes a rotational-speed detecting section 60a, first, second, and third control sections 60b to 60d as the main functions relating to the aforementioned switching.

The rotational-speed detecting section 60a detects (estimates) the rotational speed (number of rotations) N of the motor 1M on the basis of the switching states of the invers 30 and 40 and one motor current I among the motor currents I of the phase windings Lu, Lv, and Lw. Hereinafter, the rotational speed N of the motor 1M is referred to as the motor rotational speed N.

The first control section 60b sets the open-windings mode at the time of startup of the motor 1M, controls switching of the inverters 30 and 40 in such a manner that the motor rotational speed N rises to a predetermined value of the high-rotational-speed range and, at the time when the motor rotational speed N rises to the aforementioned predetermined value, controls switching of the inverters 30 and 40 in such a manner that the motor rotational speed N maintains the aforementioned predetermined value for a predetermined time of about one minute in order to secure the stability of the oil surface of the lubricating oil inside the compressor 1.

The second control section 60c controls, subsequently to the control of the first control section 60b, switching of the inverters 30 and 40 in the open-windings mode in such a manner that the motor rotational speed N becomes the target rotational speed (target speed) Nt corresponding to the capability specified by the outdoor controller 3. The second control section 60c, in particular, stores a second threshold I2 slightly less than or equal to the rated energizing current of the relays 51 and 52, and first threshold I1 less than the second threshold I2 in the internal memory, and executes the control operations of the following items (1) to (3) on the basis of the thresholds I1 and I2.

(1) At the time of the star-connection mode, when the peak value of the motor current I rises to the second threshold I2, the second control section 60c switches the mode to the open-windings mode irrespective of the motor rotational speed N by immediately opening the relay contacts 51a and 52a while continuing to carry out motor drive, and when the switching is completed, controls switching of the inverters 30 and 40 in such a manner that the motor rotational speed N becomes the target rotational speed Nt. That is, when the peak value of the motor current I rises to the threshold I2, if the star-connection mode in which the relay contacts 51a and 52a are in the closed state is continued as it is, there is a possibility of an overcurrent flowing through each of the relay contacts 5a and 52a, and hence the second control section 60c immediately switches the mode to the open-winding mode irrespective of the motor rotational speed N. In the open-windings mode in which the relay contacts 5a and 52a are in the opened state, no current flows through the relay contacts 51a and 52a in the first place, and hence it is possible to prevent the failures of the relays 51 and 52 due to the overcurrent from occurring while continuing to carry out drive of the motor 1M.

(2) At the time of the star-connection mode, when the peak value of the motor current I is less than the second threshold I2 and motor rotational speed N rises to the high-rotational-speed range greater than or equal to the second set value N2, and this state continues for the second predetermined time t2s (for example, one minute), as in the above case, the second control section 60c immediately opens the relay contacts 51a and 52a to thereby switch the mode to the open-windings mode while continuing to carry out motor drive, and controls switching of the inverters 30 and 40 in such a manner that the motor rotational speed N becomes the target rotational speed Nt. That is, in consideration of the fact that when the motor rotational speed N is within the high-rotational-speed range greater than or equal to the second set value N2, the open-windings mode in which the two inverters 30 and 40 are operated makes it possible to obtain a high-level voltage necessary for motor drive and obtain the high efficiency, the second control section 60c switches the mode to the open-windings mode. However, there is a possibility of the motor rotational speed N and motor current I being frequently varied concomitantly with variations in the air-conditioning load and the like, and hence even when variations in the motor rotational speed N and motor current I occur, switching from the star-connection mode to the open-windings mode is restrained for at least the second predetermined time t2S necessary for the variations to be resolved. Thereby, it is possible to prevent frequent opening/closing of the relay contacts 51a and 52a from occurring and, by extension, it is possible to reduce the number of times of opening/closing of the relay contacts 51a and 52a, and realize lifetime-prolongation of the relays 51 and 52.

(3) At the time of the open-windings mode, when a state where the peak value of the motor current I is less than or equal to the first threshold I1 continues for the first predetermined time (for example, 20 minutes), t1s, the second control section 60c closes the relay contacts 51a and 52a to thereby switch the mode to the star-connection mode while continuing to carry out motor drive and, when the mode switching is completed, controls switching of the inverter. 30 in such a manner that the motor rotational speed N becomes the target rotational speed Nt (switching of the inverter 40 is stopped). More specifically, at the time of the open-windings mode, when a slate where the peak value of the motor current I is less than or equal to the first threshold I1, and state where the motor rotational speed N is within the low-rotational-speed range less than or equal to the first set value less than the second set value N2 continue for the first predetermined time t1s, the second control section 60c closes the relay contacts 51a and 52a to thereby switch the mode to the star-connection mode while continuing to carry out motor drive, and controls switching of the inverter 30 in such a manner that the motor rotational speed N becomes the target rotational speed Nt. That is, in consideration of the fact that when the peak value of the motor current I continues to uninterruptedly stay in a state where the peak value is less than or equal to the first threshold I1 for the first predetermined time t1s or more, even if the star-connection mode in which the relay contacts 51a and 52a are closed is set, there is no fear that an overcurrent flows through each of the relay contacts 51a and 52a, and fact that when the motor rotational speed N continues to uninterruptedly stay in a state where the rotational speed N is within the low-rotational-speed range less than or equal to the first set value N1 for the first predetermined time t1s, it is possible to obtain a voltage of a level sufficient for motor drive even in the highly efficient star-connection mode in which only one inverter 30 is operated, the second control section 60c switches the mode to the star-connection mode.

It should be noted that setting the first threshold I1 which is the criterion for determination about switching the mode from the open-windings mode to the star-connection mode lower than the second threshold I2 which is a criterion for determination about switching the mode from the star-connection mode to the open-windings mode is carried out for the purpose of coping with the fact that when the mode is switched from the open-windings mode to the star-connection mode, the motor current i becomes greater at the time of the star-connection mode than at the time of the open-windings mode even if the drive is carried out at the same rotational speed N due to the influence of the magnitude or the like of a field component current (d-axis current) converted into the field axis (d-axis) coordinate on the rotor axis in the motor 1M. That is, by setting the first threshold I1 lower than the second threshold I2, it is possible to previously prevent the problem that the peak value of the motor current I rises to the second threshold I2 immediately after the mode is switched from the opera-windings mode to the star-connection mode, and the mode is switched from the star-connection mode to the open-windings mode from occurring. In this regard as well, it is possible to reduce the number of times of opening/closing of the relay contacts 51a and 52a.

Figure 3:
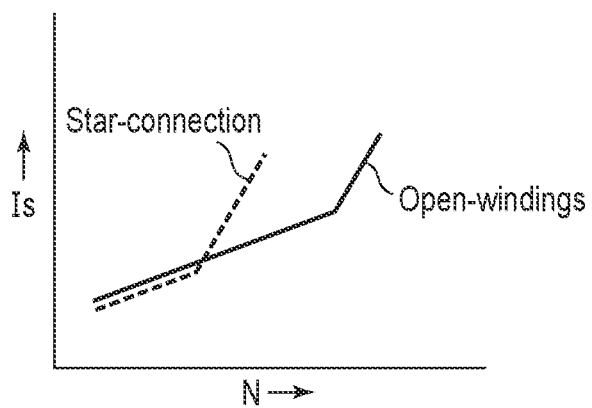
FIG. 3 is a view showing a relationship between a motor rotational speed and motor current in the motor drive unit of the embodiment separately as to each of the star-connection mode and open-windings mode.

FIG. 3 shows a relationship between the motor rotational speed N and power source current Is separately as to each of the star-connection mode and open-windings mode. When the motor rotational speed N is low, the power source current Is at the time of the star-connection mode becomes a little less than the power source current Is at the time of the open-windings mode, and thus the efficiency at the time of the star-connection mode is better. As the motor rotational speed N rises from the low rotational speed, the power source current Is at the time of the star-connection mode rises at a high rate, and power source current Is at the time of the open-windings mode rises slowly. In this case, at the time of the star-connection mode, the motor current I becomes greater and, at the same time, the counter-electromotive force of the motor 1M becomes greater, and thus it becomes impossible to drive the motor 1M at a further higher rotational speed.

Figure 4:
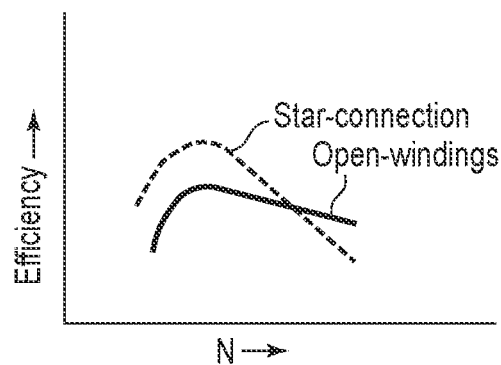
FIG. 4 is a view showing a relationship between a motor rotational speed and efficiency in the motor drive unit of the embodiment separately as to each of the star-connection mode and open-windings mode.

FIG. 4 shows a relationship between the motor rotational speed N and efficiency separately as to each of the star-connection mode and open-windings mode. When the motor rotational speed N is low, the efficiency in the star-connection mode is higher than that in the open-windings mode and, when the motor rotational speed N becomes higher, the efficiency in the open-windings mode becomes higher than that in the star-connection mode.

Figure 5:
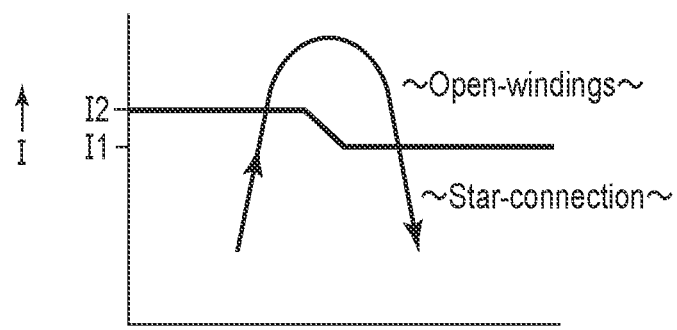
FIG. 5 is a view showing a mode switching condition in the motor drive unit of the embodiment.

In consideration of the characteristics of the motor 1M of FIG. 3 and FIG. 4, a mode switching condition shown in FIG. 5 for obtaining the highest possible efficiency within such a range that the motor current I does not exceed the rated energizing current of each of the relays 51 and 52 is stored in the second control section 60c of the controller 9b.

When executing the defrosting operation by the outdoor controller 8, the aforementioned third control section 60d sets, irrespective of the motor current I, the open-windings mode before starting of the defrosting operation, and continues to maintain the set state until the defrosting operation is completed. More specifically, at the point in time of receipt of a notification that defrosting is needed from the outdoor controller 3, i.e., at the point in time of defrosting preparation before starting of the defrosting operation after the changeover in the flow path of the four-way valve 2, the third control section 60d sets the open-windings mode irrespective of the motor current I, controls switching of the inverters 30 and 40 in such a manner that the motor rotational speed N becomes the target rotational speed Nt for the defrosting operation corresponding to the instruction from the outdoor controller 8, and continues the set state of the open-windings mode unrelated to the motor current I until a notification of a termination of the defrosting operation is received from the outdoor controller 8.

Figure 6:
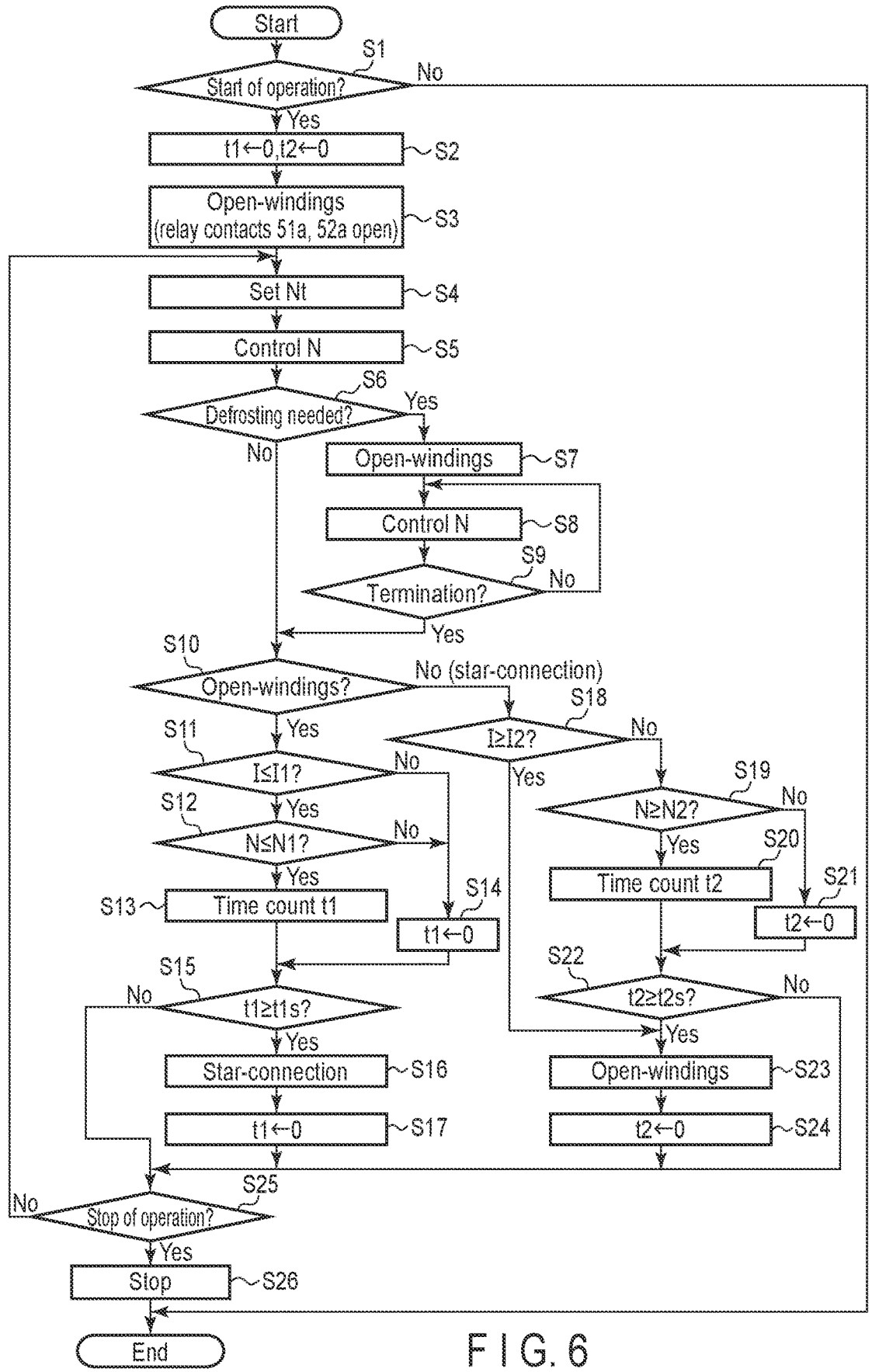
FIG. 6 is a flowchart showing control of the motor drive unit of the embodiment.

Next, the control to be executed by the controller 9b will be described with reference to the flowchart of FIG. 6. Steps S1, S2, . . . in the flowchart are abbreviated simply as S1, S2, . . . .

[At the Time of Startup of Motor 1M]

Upon receipt of an operation start instruction from the outdoor controller 8 (YES of S1), the controller 9b initializes each of time counts t1 and t2 to "0" (S2), and sets the open-windings mode in which the other ends of the phase windings Lu, Lv, and Lw are placed in the unconnected state by opening of the relay contacts 51a and 52a, whereby switching of the inverters 30 and 40 is carried out (S3). At the time of a stop of the motor 1M, the normally open relay contacts 51a and 52a are in the opened state from the beginning due to non-energization (energization-off) of the relays 51 and 52, and phase windings Lu, Lv, and Lw are in the mutually unconnected state, and hence it is possible to set the open-windings mode without the need to operate the relay contacts 51a and 52a.

Concomitantly with the setting of the open-windings mode, the controller 9h sets a target rotational speed Nt commensurate with the capability based on the instruction from the outdoor controller 8 (S4), and controls switching of the inverters 30 and 40 in such a manner that the motor rotational speed N becomes the target rotational speed Nt (S5). Thereby, the motor 1M is started. Setting of the target rotational speed Nt and switching control at the time of the startup includes control of raising the motor rotational speed N to a predetermined value in the high-rotational-speed range and maintaining the state for a predetermined time of about one minute.

A part of the current paths to be formed at the time of the open-windings mode is indicated by broken lines in FIG. 2. First, the IGBT 31 of the inverter 30 is turned on, then IGBT 42 of the inverter 40 is repetitively turned on and turned off, both IGBTs 43 and 45 of the inverter 40 are turned on, and IGBTs 34 and 36 of the inverter 30 are repetitively turned on and turned off in synchronization with each other. Thereby, as indicated by dashed arrows, a current flows from the positive output end of the DC power source 55 to the phase winding Lu through the IGBT 31, the current passing through the phase winding Lu flows to the negative output end of the DC power source 55 through the IGBT 42, at the same time, currents flow from the positive output end of the DC power source 55 to the phase windings Lv and Lw through the IGBTs 43 and 45, and the currents passing through the phase windings Lv and Lw flow to the negative side output end of the DC power source 55 through the IGBTs 34 and 36. Next, the IGBT 33 of the inverter 30 is turned on, then IGBT 44 of the inverter 40 is repetitively turned on and turned off, both IGBTs 41 and 45 of the inverter 40 are turned on, and IGBTs 32 and 36 of the inverter 30 are repetitively turned on and turned off in synchronization with each other. Thereby, a current flows from the positive output end of the DC power source to the phase winding Lv through the IGBT 33, the current passing through the phase winding Lv flows to the negative side output end of the DC power source 55 through the IGBT 44, at the same time, currents flow from the positive side output end of the DC power source 55 to the phase windings Lu and Lw through the IGBTs 41 and 45, the currents passing through the phase windings Lu and Lw flow to the negative side output end of the DC power source 55 through the IGBTs 32 and 36. Next, the IGBT 35 of the inverter 30 is turned on, then IGBT 46 of the inverter 40 is repetitively turned on and turned off, at the same time, both IGBTs 41 and 43 of the inverter 40 are turned on, and IGBTs 32 and 34 of the inverter 30 are repetitively turned on and turned off in synchronization with each other. Thereby, a current flows from the positive side output end of the DC power source 55 to the phase winding Lw through the IGBT 35, the current passing through the phase winding Lw flows to the negative side output end of the DC power source 55 through the IGBT 46, at the same time, currents flow from the positive side output end of the DC power source 55 to the phase windings Lu and Lv through the IGBTs 41 and 43, and the currents passing through the phase windings Lu and Lv flow to the negative side output end of the DC power source 55 through the IGBTs 32 and 34. These three patterns of current paths are switched from one to another in sequence, whereby the rotor of the motor 1M is rotated.

By the setting of the open-windings mode, it is possible to apply a voltage about $\sqrt{3}$ times the voltage at the time of the star-connection mode to each of the phase windings Lu, Lv, and Lw, and hence it becomes possible to efficiently raise the motor rotational speed N to the high-rotational-speed range corresponding to the high air-conditioning load at the time of startup of the operation. At the time of startup of the air conditioner, in particular, not only the air-conditioning load is high, but also indoor temperature sensing is in an unstable state because the indoor fan 13 has only just started to operate and no fresh indoor air adequately flows to the indoor temperature sensor 14, and thus it is difficult to appropriately grasp the air-conditioning load. Under such circumstances at the time of startup of the operation, in the case where the open-windings mode in which the relay contacts 51a and 52a are left opened without energizing the relays 51 and 52 is set from the beginning and rotational speed N of the motor 1M is raised to the high-rotational-speed range, it is possible to make the number of times of operations of the relay contacts 51a and 52a surely less by at least once than in the case where the star-connection mode in which the relay contacts 51a and 52a are closed by energizing the relays 51 and 52 is set in the low-rotational-speed range and thereafter the mode is shifted to the open-windings mote in the high-rotational-speed range. That is, it becomes possible to make the air conditioner exert air-conditioning capability sufficient to be able to cope with an unstable high air-conditioning load while holding down the number of times of operations of the relay contacts 51a and 52a to a small value.

[After Startup of Motor 1M]

Concomitantly with the startup of the motor 1M based on the open-windings mode, the controller 9b confirms whether or not there is a notification about the need for defrosting from the outdoor controller 8 (S6). When there is no notification about the need for defrosting (NO of S6), at the current point in time, the open-windings mode is set (YES of S10), and hence when the peak value of the motor current I stays at a value less than or equal to the first threshold I1 (YES of S11), and motor rotational speed N is lowered to a value less than or equal to the set value N1 (YES of S12), the controller 9b starts the time count t1 (S13) and compares the time count t1 and predetermined time (20 minutes) t1s with each other (S15).

While the time count t1 is less than the predetermined time tis (NO of S15), the controller 9b confirms an operation stop instruction from the outdoor controller 8 (S25). When there is no operation stop instruction (NO of S25), the controller 9b returns to aforementioned S4 to set a target rotational speed Nt (S4), and controls switching of the inverters 30 and 40 in such a manner that the motor rotational speed N becomes the target rotational speed Nt (S5).

Subsequently, when there is no notification about the need for defrosting (NO of S6), the controller 9b repeats the determination from aforementioned 310.

In the determination of aforementioned S11, when the peak value of the motor current I rises from the range less than or equal to the first threshold I1 to the range exceeding the first threshold I1 (NO of S11) or when, in the determination of aforementioned S11, the motor rotational speed N rises from the range less than or equal to the set value N1 to the range exceeding the set value N1 (NO of S12), the controller 9b clears the time count t1 to "0" (S14), and then compares the time count t1 and predetermined time t1s with each other (S15).

In the determination of aforementioned 511, when the peak value of the motor current I stays at the value less than or equal to the first threshold I1 (YES of S11) and, moreover, in the determination of aforementioned S12, when the motor rotational speed is left lowered to the value less than or equal to the set value N1 (YES of S12), the time count t1 is continued, and time count t1 reaches the predetermined time t1s (S13, YES of S15), the controller 9b switches the mode from the preceding open-windings mode to the star-connection mode (516), and clears the time count t1 to "0" (S17). Then, when there is no operation stop instruction (NO of S25), the controller 9b returns to aforementioned S4 to set a target rotational speed Nt (S9), and controls switching of the inverter 30 in such a manner that the motor rotational speed N becomes the target rotational speed Nt (S5).

Subsequently, when there is no notification about the need for defrosting (NO of S6), the mode set at the current point in time is the star-connection mode (NO of S10), and hence the controller 9b determines whether or not the motor rotational speed N is greater than or equal to the set value N2 (S19) on the premise that the peak value of the motor current I is less than the second threshold 12 (NO of S18). When the motor rotational speed N is greater than or equal to the set value N2 (YES of S19), the controller 9b starts the time count t2 (S20), and compares the time count t2 and predetermined time (1 minute) t2s with each other (S22).

While the time count t1 is less than the predetermined time t1s (NO of S22), when there is no operation stop instruction (NO of S25), the controller 9b returns to aforementioned S4 to set a target rotational speed Nt (S4), and controls switching of the inverter 30 in such a manner that the motor rotational speed N becomes the target rotational speed Nt (S5). Subsequently, when there is no notification about the need for defrosting (NO of S6), the controller 9b repeats the determination from aforementioned S10.

When, in the determination of aforementioned S18, the prerequisite condition that the peak value of the motor current I be less than the second threshold 12 remains satisfied (NO of S18) and, moreover, in the determination of aforementioned S19, the motor rotational speed N remains to stay at a value greater than or equal to the set value N2 after reaching the value (YES of S19), further the time count t2 is continued and time count t2 reaches the predetermined time t2s (320, YES of S22), the controller 9b switches the mode from the preceding star-connection mode to the open-windings mode (S23), and clears the time count t2 to "0" (S24). Then, when there is no operation stop instruction (NO of S25), the controller 9b returns to aforementioned S4 to set a target rotational speed Nt (S4), and controls switching of the inverters 30 and 40 in such a manner that the motor rotational speed N becomes the target rotational speed Nt (S5). Subsequently, when there is no notification about the need for defrosting (NO of S6), the controller 9h repeats the determination from aforementioned 310.

Even when, in the determination of aforementioned S18, the prerequisite condition that the peak value of the motor current I be less than the second threshold I2 remains satisfied (NO of S18), if, in the determination of aforementioned S19, the motor rotational speed N lowers to a value in the range less than the set value N2 (NO of S19), the controller 9b clears the time count t1 to "0" (S21) and compares the time count t1 and predetermined time t1s with each other (S22).

However, when, in the determination of aforementioned S18, the peak value of the motor current I rises to the second threshold I2 (YES of S18), there is a possibility of an overcurrent exceeding the rated energizing current continuously flowing through each of the relay contacts 51a and 52a, and hence the controller 9b immediately switches the mode from the star-connection mode to the open-windings mode (S23). In the open-windings mode in which the relay contacts 51a and 57a are in the opened state, no current flows through each of the relay contacts 51a and 52a from the beginning, and hence it is possible to avoid the adverse influence of the overcurrent on the relays 51 and 52.

When, in the determination of aforementioned 56, there is a notification about the need for defrosting (YES of S6), the controller 9b compulsorily sets the open-windings mode irrespective of the motor current I (S7), and controls switching of the inverters 30 and 40 in such a manner that the motor rotational speed N becomes the target rotational speed Nt for the defrosting operation corresponding to the instruction from the outdoor controller 8 (S8). Then, the controller 9b confirms a termination notification of the defrosting operation from the outdoor controller 8 (S9). When there is no termination notification (NO of S9), the controller 9b repeats the control of switching of aforementioned 53.

An example of changes in the motor rotational speed N during the period from the time when defrosting preparation is started according to the notification about the need for defrosting to the time when the defrosting operation is completed after the defrosting operation is subsequently executed is shown in FIG. 7. During the defrosting operation in which the load becomes larger, the motor rotational speed N reaches the high-rotational-speed range, and hence by setting the open-windings mode in advance before the starting of the defrosting operation, it becomes possible to carry out a stable and secure defrosting operation.

CONCLUSION

In short, in consideration of the fact that when, at the time of the open-windings mode, the peak value of the motor current I is in such a state that the peak value continues to be in the state where the peak value is less than or equal to the first threshold I1 less than the rated energizing current of each of the relays 51b and 52n tor the predetermined time tis, even if the mode is switched to the star-connection mode, there is no fear of an overcurrent flowing through each of the relay contacts 51a and 52a and, further in consideration of the fact that when the motor rotational speed is in the state where the motor rotational speed continuously stays in the low-rotational-speed range less than or equal to the set value N1 for the predetermined time t1s, even if the mode is switched to the highly efficient star-connection mode in which the only one inverter 30 is operated, it is possible to obtain a voltage of a level sufficient for motor drive, the mode is switched to the star-connection mode.

At the time of the star-connection mode, when the motor rotational speed N is in a state where the motor rotational speed N stays in the high-rotational-speed range greater than or equal to the set value N2 for the predetermined time t2s or more on the premise that the peak value of the motor current I is less than the second threshold 12, further higher efficiency can be obtained in the open-windings mode in which the two inverters 30 and 40 are operated, and hence the mode is switched to the open-windings mode.

However, at the time of the star-connection mode, when the peak value of the motor current i rises to the second threshold 12, in order to give a higher priority to overcurrent prevention than to the efficiency, the mode is immediately switched to the open-windings mode in which no current flows through each of the relay contacts 51a and 52a.

Accordingly, it is possible to carry out the motor drive with the highest possible degree of efficiency while preventing the problem that an overcurrent flows through each of the relay contacts 51a and 52a from occurring. No overcurrent flows through each of the relay contacts 51a and 52a, and hence it is possible to realize lifetime improvement of the relay contacts 51a and 52a.

Switching between the open-windings mode and star-connection mode is not frequently repeated, and hence it is possible to hold down the number of times of operations of the relays 51 and 52 to the smallest possible number. In this regard as well, the lifetime of the relay contacts 51a and 52a is improved.

Modified Example

Although in the embodiment described above, switching between the open-windings mode and star-connection mode is executed by using the peak value of the instantaneous value as the motor current value I, switching between the open-windings mode and star-connection mode may be carried cut by using the effective value Ia in place of the peak value of the instantaneous value.

Furthermore, although in the embodiment described above, switching between the open-windings mode and star-connection mode is executed according to the rotational speed of the motor, it is possible to use a d-axis current value which is a field-weakening amount considered to be on a parity with the rotational speed of the motor, PWM voltage output duty of the inverter, modulation factor or the like in place of the motor rotational speed.

Although in the embodiment described above, the power-communalized system in which the inverters 30 and 40 are connected to the same OC power source 55 is employed, the embodiment can also be implemented in the same manner in the power-isolated system in which the inverters 30 and 40 are connected to DC power sources separate from each other.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A motor drive unit comprising:
    a motor including a plurality of phase windings in a mutually unconnected state;
    a first inverter which controls application of electric power to one ends of the phase windings;

a second inverter which controls application of electric power to the other ends of the phase windings;

relays each of which includes a make/break contact connected between the other ends of the phase windings; and a controller which switches, according to a value of a current flowing through the motor, between an open-windings mode in which the other ends of the phase windings are placed in the unconnected state by opening of the relays, and switching operations of the first and the second inverters are carried out in coordination with each other, and a star-connection mode in which the other ends of the phase windings are connected to each other by closing of the relays, and switching of the first inverter is thereby carried out;

wherein the controller switches, at the time of the star-connection mode, when the current flowing through the motor rises to a second threshold less than or equal to a rated energizing current of the relay, the star-connection mode to the open-windings mode.

2. The motor drive unit of claim 1, wherein the controller switches, at the time of the open-windings mode, when the current flowing through the motor continues to be in a state where the current is less than or equal to a first threshold less than the second threshold for a predetermined time, the open-windings mode to the star-connection mode.

3. The motor drive unit of claim 1, wherein the controller switches, at the time of the star-connection mode, when the current flowing through the motor rises to a second threshold less than or equal to a rated energizing current of the relay, and when a rotational speed of the motor rises to a value greater than or equal to a second set value and this state continues for a predetermined time, the star-connection mode to the open-windings mode.

4. The motor drive unit of claim 3, wherein the controller switches, at the time of the open-windings mode, when the current flowing through the motor is in a state where the current is less than or equal to a first threshold less than the second threshold and, moreover, the rotational speed of the motor continues to be in a state where the rotational speed is less than or equal to a first set value less than the second set value for the predetermined time, the open-windings mode to the star-connection mode.

5. The motor drive unit of claim 1, wherein the controller sets the open-windings mode at the time of startup of the motor.

6. A refrigeration cycle apparatus comprising the motor drive unit of claim 1, wherein when executing a defrosting operation of the refrigeration cycle apparatus, the controller sets, irrespective of the current flowing through the motor, the open-windings mode before starting of the defrosting operation, and continues to maintain the set state until the defrosting operation is completed.

* * * * *